(12) United States Patent
Meintschel et al.

(10) Patent No.: US 8,871,377 B2
(45) Date of Patent: Oct. 28, 2014

(54) BATTERY WITH A PLURALITY OF INDIVIDUAL CELLS

(75) Inventors: Jens Meintschel, Bernsdorf (DE); Dirk Schroeter, Winnenden (DE); Wolfgang Warthmann, Weinstadt (DE)

(73) Assignee: Daimler AG, Stuttgart (DE)

( * ) Notice: Subject to any disclaimer, the term of this patent is extended or adjusted under 35 U.S.C. 154(b) by 1077 days.

(21) Appl. No.: 12/918,680

(22) PCT Filed: Feb. 19, 2009

(86) PCT No.: PCT/EP2009/001179
§ 371 (c)(1),
(2), (4) Date: Oct. 25, 2010

(87) PCT Pub. No.: WO2009/103527
PCT Pub. Date: Aug. 27, 2009

(65) Prior Publication Data
US 2011/0033736 A1 Feb. 10, 2011

(30) Foreign Application Priority Data

Feb. 23, 2008 (DE) .......... 10 2008 010 828

(51) Int. Cl.
| | |
|---|---|
| H01M 6/12 | (2006.01) |
| H01M 6/46 | (2006.01) |
| H01M 2/02 | (2006.01) |
| H01M 10/48 | (2006.01) |
| H01M 10/6556 | (2014.01) |
| H01M 10/6554 | (2014.01) |
| H01M 10/613 | (2014.01) |
| H01M 2/10 | (2006.01) |
| H01M 2/26 | (2006.01) |
| H01M 10/647 | (2014.01) |

(52) U.S. Cl.
CPC .......... *H01M 2/266* (2013.01); *H01M 10/5032* (2013.01); *H01M 10/482* (2013.01); *H01M 2/0212* (2013.01); *H01M 10/5057* (2013.01); *H01M 10/5053* (2013.01); *H01M 10/5004* (2013.01); *H01M 2/1061* (2013.01); *Y02E 60/12* (2013.01)
USPC ........................... 429/162; 429/178; 429/181

(58) Field of Classification Search
CPC ....................................................... H01M 6/12
USPC ........... 429/99, 100, 149, 156, 158, 159, 160, 429/162
See application file for complete search history.

(56) References Cited

U.S. PATENT DOCUMENTS

| | | | |
|---|---|---|---|
| 5,314,507 A * | 5/1994 | Rossoll | 29/623.4 |
| 6,087,036 A | 7/2000 | Rouillard et al. | |

(Continued)

FOREIGN PATENT DOCUMENTS

| | | |
|---|---|---|
| CN | 1499664 A | 5/2004 |
| CN | 1555584 A | 12/2004 |

(Continued)

OTHER PUBLICATIONS

Chinese Office Action with English Translation dated Aug. 31, 2012 (eight (8) pages).

(Continued)

*Primary Examiner* — Barbara Gilliam
*Assistant Examiner* — Steven Scully
(74) *Attorney, Agent, or Firm* — Crowell & Moring LLP

(57) ABSTRACT

A battery comprises a plurality of individual cells whose poles are electrically interconnected with each other in series and/or in parallel and form a cell assembly. A sealing element is arranged at least in one edge region between the poles of adjacent individual cells.

16 Claims, 6 Drawing Sheets

(56) References Cited

U.S. PATENT DOCUMENTS

| | | |
|---|---|---|
| 7,767,337 B2 | 8/2010 | Fredriksson et al. |
| 2004/0038123 A1 | 2/2004 | Hisamitsu et al. |
| 2004/0038124 A1* | 2/2004 | Hisamitsu et al. ............ 429/161 |
| 2004/0091771 A1 | 5/2004 | Hosaka et al. |

FOREIGN PATENT DOCUMENTS

| | | |
|---|---|---|
| DE | 198 10 746 A1 | 9/1999 |
| JP | H-03-241669 A | 10/1991 |
| JP | 9-35725 A | 2/1997 |
| JP | 2001-511594 A | 8/2001 |
| JP | 2002-279969 A | 9/2002 |
| JP | 2003-036819 A | 2/2003 |
| JP | 2004-031195 A | 1/2004 |
| JP | 2004-031270 A | 1/2004 |
| JP | 2004-087238 A | 3/2004 |
| JP | 2005-116427 A | 4/2005 |
| JP | 2005-276486 A | 10/2005 |
| WO | WO 01/95408 A2 | 12/2001 |

OTHER PUBLICATIONS

International Search Report with partial translation dated May 12, 2009 (Eight (8) pages).
PCT/ISA/237 (Seven (7) pages).
German Office Action dated Jan. 16, 2009 (Three (3) pages).
Notification of Reason for Refusal dated Aug. 27, 2013 w/ partial English translation (Ten (10) pages).

* cited by examiner

BATTERY WITH A PLURALITY OF INDIVIDUAL CELLS

BACKGROUND AND SUMMARY OF THE INVENTION

This application is a national stage of PCT International Application No. PCT/EP2009/001179, filed Feb. 19, 2009, which claims priority under 35 U.S.C. §119 to German Patent Application No. 10 2008 010 828.6, filed Feb. 23, 2008, the entire disclosure of which is herein expressly incorporated by reference.

The present invention relates to a battery having a plurality of individual cells.

According to the state of the art, high voltage batteries, such as lithium ion batteries, are known for vehicle uses, which are in particular constructed of several individual cells interconnected electrically in series or in parallel. Thereby, poles guided from a housing of the individual cells can be electrically connected by means of cell connectors on the one hand, wherein connection contacts for monitoring functions (e.g., cell voltage monitoring) are provided. On the other hand, with bipolar individual cells, in which a plus and a minus pole are placed directly on parts of the housing that are electrically insulated with regard to each other, the parts of the housing forming the electrical contacts are connected directly in a form-fit or force-fit manner. With such as force-fit connection, connection for measuring connections, for example for the cell voltage monitoring, is not possible.

One object of the invention, therefore, is to provide an improved battery, which in particular overcomes the disadvantages given in the state of the art and which can be produced in a simple and cost-efficient manner.

This and other object and advantages are achieved by the battery according to the invention, which comprises a plurality of individual cells, whose poles are electrically interconnected with each other in series or in parallel and form a cell assembly, with each individual cell being surrounded by a cell housing formed of two cell housing side walls and a cell housing frame (2.3). The battery according to the invention is distinguished in that at least one of the poles of a respective individual cell has at least two voltage connection contacts. An arrangement of connections, in particular of different voltage connection contacts as e.g., high or low voltage connection contacts (also called HV or LV contacts) can thus be optimized with regard to installation space and function.

The different voltage connection contacts are thereby conveniently electrically connected (in particular in parallel) within the cell using one of the electrically conductive metallic cell housing side walls, so that no additional connection elements, as conventional cell connectors, are necessary. A simplification of the assembly of the battery and thus a cost savings is achieved thereby.

In a possible embodiment, a first voltage connection contact forms one of the poles of the individual cell and the second voltage connection contact forms a measuring connection. The poles of the individual cell are thereby formed by the electrically conductive, in particular metallic cell housing side walls in a manner that is simple and saves installation space, wherein the pole contact with different polarity of the respective individual cell are placed directly on the cell housing side walls that are electrically insulated with regard to one another.

In a further embodiment, the different voltage connection contacts can be arranged at an arbitrary location independently of each other. In a possible embodiment, the voltage connection contact forming the pole is one of the cell housing walls. The other voltage connection contact formed as a measuring connection is designed as a tab-like extension and projects radially from the corresponding cell housing side wall in an arbitrary direction. By means of these different configurations, voltage connection contacts formed using an individual cell housing side wall can be adapted to the voltage and current, and to their functions, in an optimum manner.

The poles of different individual cells are conveniently interconnected electrically by contacting the cell housing side walls of the individual cells. The individual cells or flat cells are contacted with each other in the axial direction in particular in a cell assembly formed of flat cells. This represents a particularly compact construction which saves installation space.

In a preferred manner, the cell housing side wall of each individual cell provided with two voltage connection contacts has a measuring connection as a voltage connection contact. The measuring connection is conveniently designed as a tab-like extension projecting from the cell housing side wall, which extension is electrically connected to an electronic component, in particular an encapsulated electronic component. The electronic component preferably has devices for a cell voltage monitoring and a cell voltage balancing, so that a same voltage level of the individual cells, and thus a higher reliability of the battery, are always ensured.

In a further arrangement of the invention, the individual cells and/or the pole contacts of different individual cells are connected to each other in a force-fit, form-fit and/or material-fit manner. A durable electrical contact between the poles of the individual cells is thereby ensured in a simple manner.

The individual cells are additionally formed of an electrode stack arranged in a cell housing, wherein at least electrodes with a different polarity are separated in an insulating manner from each other by a separator, preferably a separator film. In a particular manner, an edge region of the respective electrode film guided to the outside of the electrode stack forms a pole contact formed as a current drain tab, whereby an elaborate contacting of electrode film and pole contact is omitted. This type of contacting is at the same time very safe against at least many, in particular outer influences such as impacts or vibrations.

Current drain tabs, that is, the pole contacts, with the same polarity are connected in an electrically conductive manner to a pole. The pole contacts of a pole are further pressed together and/or welded in an electrically conductive manner.

By an arrangement of the electrode stack in an in particular electrically insulating frame which passes around on the edge side, an additional insulating arrangement can be saved in an advantageous manner. The manipulation of the individual cell is further eased or designed in a safer manner.

In a particular manner, especially with bipolar individual cells, the contacting of the pole contacts takes place directly to the cell housing side walls lying opposite to each other, in particular flat sides of the cell housing. These cell housing side walls, in particular flat sides, are electrically insulated with regard to each other by means of the cell housing frame. In this manner, pole contacts (=current drain tabs) with the same polarity are directly connected electrically to a cell housing side wall (=cell outer wall), preferably a flat side of the cell housing, in particular a flat cell, so that the cell housing side walls form the electrical poles of the individual cell. The pressure tightness of the cell housing of the individual cell is also not weakened, as a contact feedthrough of the poles does not take place. An improvement of the tightness of the interior of the cell housing with regard to a passage of humidity is hereby also directly connected.

According to a sensible further continuation of the invention, at least respectively one electrical connection element is arranged at a cell housing side wall of the first individual cell and a cell housing side wall of a last individual cell, so that a simple electrical contacting of the battery is possible.

In one arrangement of the invention, the cell housing frame has two material depressions electrically insulated and spaced from each other, in which are arranged the pole contacts of respectively one polarity formed as current drain tabs. In a sensible manner, the clear height of a material depression in the direction of the stacking of the electrode films is the same as or smaller than the corresponding extension of the associated pole contacts stacked above each other in an uninfluenced manner, and their depth measured parallel to the flat side of an electrode film is larger than or the same as the corresponding extension of the associated pole contacts. The poles are thus held safely in the material depressions and can be pressed with these in an electrically conductive manner with an in particular tight connection between the cell housing frame and the cell housing side walls.

In order to discharge lost heat developing in the battery, a heat-conducting plate is provided for cooling the battery. In an advantageous embodiment of the invention, a heat-conductive material is introduced between the heat-conducting plate and the cell assembly, which is preferably formed of a casting mass, a lacquer and/or a heat-conducting film. This leads to an increase of the heat transfer between the cell assembly and the heat-conducting plate and thereby increases the performance on the one hand and the durability of the battery on the other hand.

In a preferred manner, at least the cell assembly and the heat-conducting plate are arranged in a housing frame, which is especially formed as a clamping element surrounding at least completely the cell assembly and the heat-conducting plate, in particular a clamping strap or a clamping frame.

By one or several of the mentioned measures, it is possible to simplify the construction of a battery and the contacting of the individual cells with an inexpensive manufacture, wherein the poles are at the same time safely protected from foreign matter, in particular humidity and following from that from corrosion by the use of a sealing element.

Other objects, advantages and novel features of the present invention will become apparent from the following detailed description of the invention when considered in conjunction with the accompanying drawings.

DETAILED DESCRIPTION OF THE DRAWINGS

Figure 1:
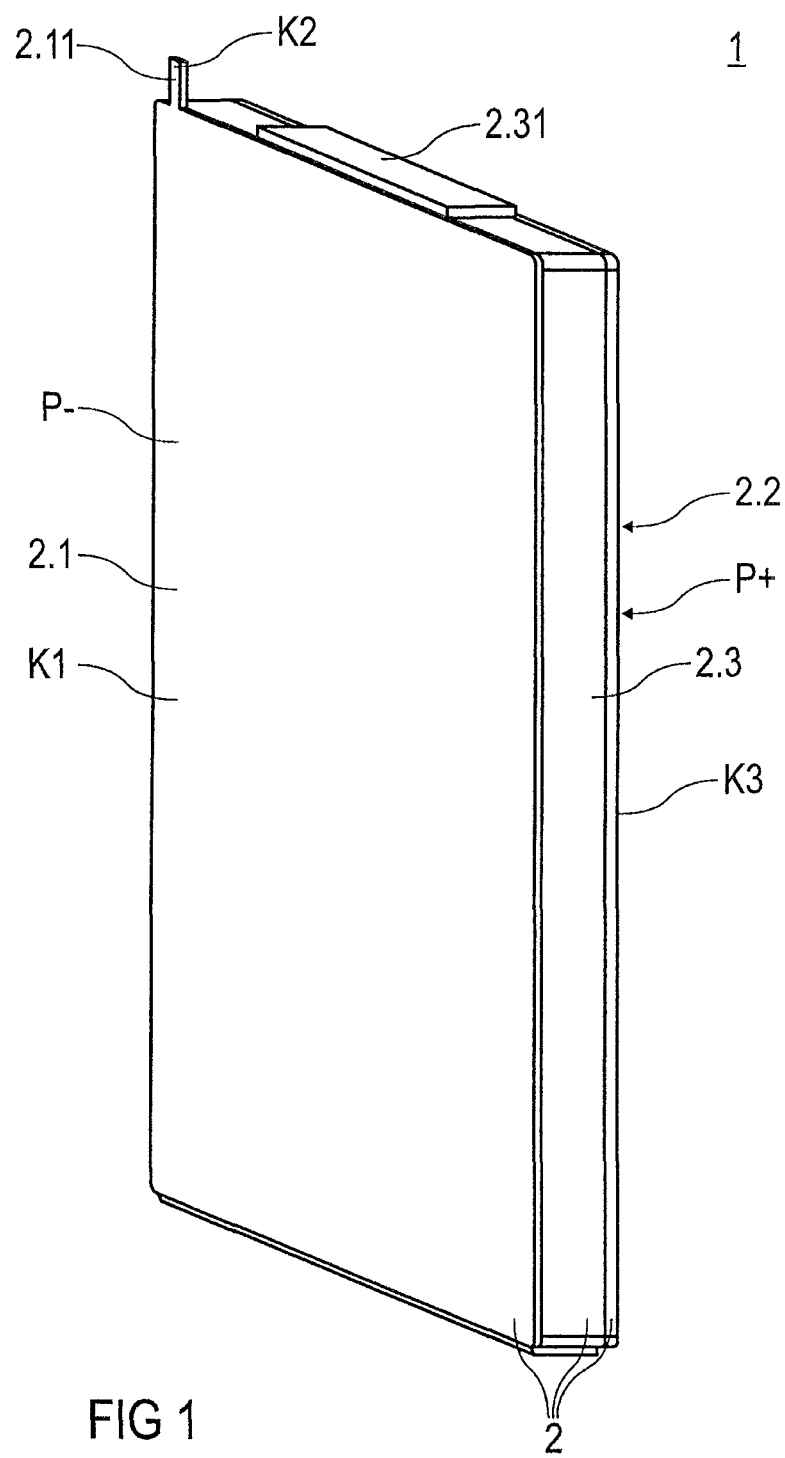
FIG. 1 is a schematic perspective view of an individual cell.

Parts corresponding to each other are provided with the same reference numerals in all figures.

Figure 2:
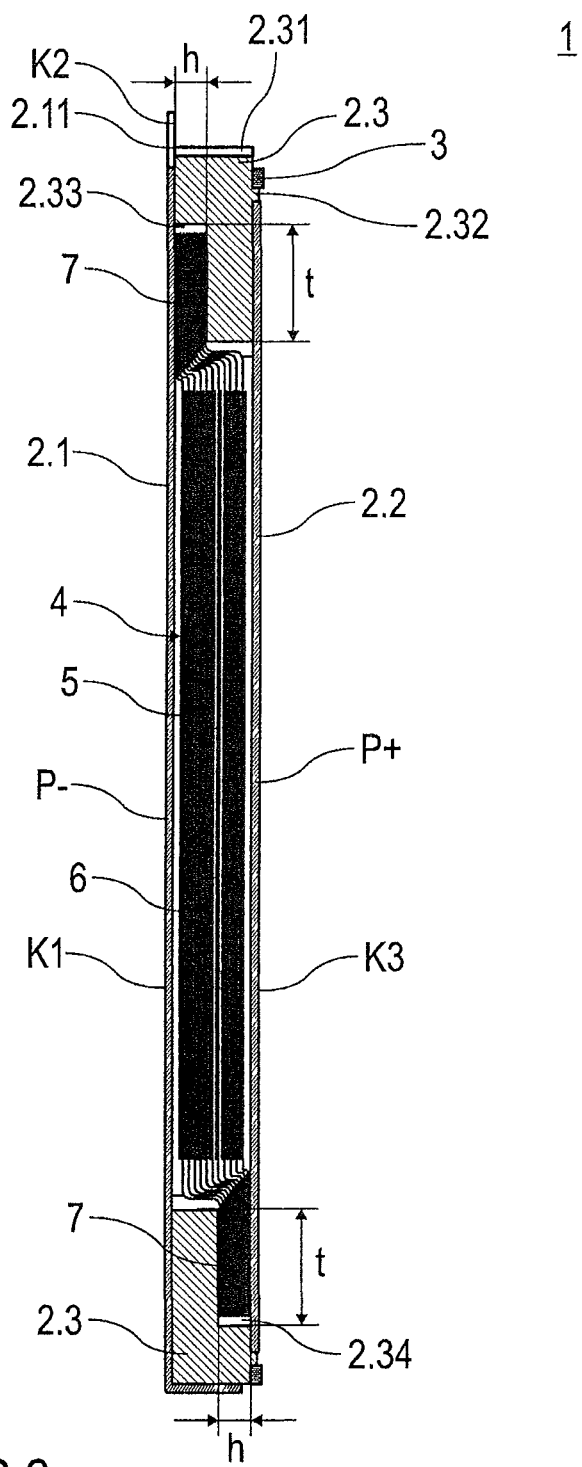
FIG. 2 is a schematic sectional depiction of the individual cell according to FIG. 1.

FIG. 1 and FIG. 2 show an individual cell 1 formed as a flat cell. A cell housing 2 of the individual cell 1 is thereby formed of two cell housing side walls 2.1, 2.2 and a cell housing frame 2.3 arranged between them and passing around on the edge side.

The cell housing side walls 2.1, 2.2 of the individual cell 1 are designed in an electrically conductive manner and form poles P+, P− of the individual cell 1.

The cell housing frame 2.3 is designed in an electrically insulating manner, so that the cell housing side walls 2.1, 2.2 with different polarity are electrically insulated from each other.

Figure 5:
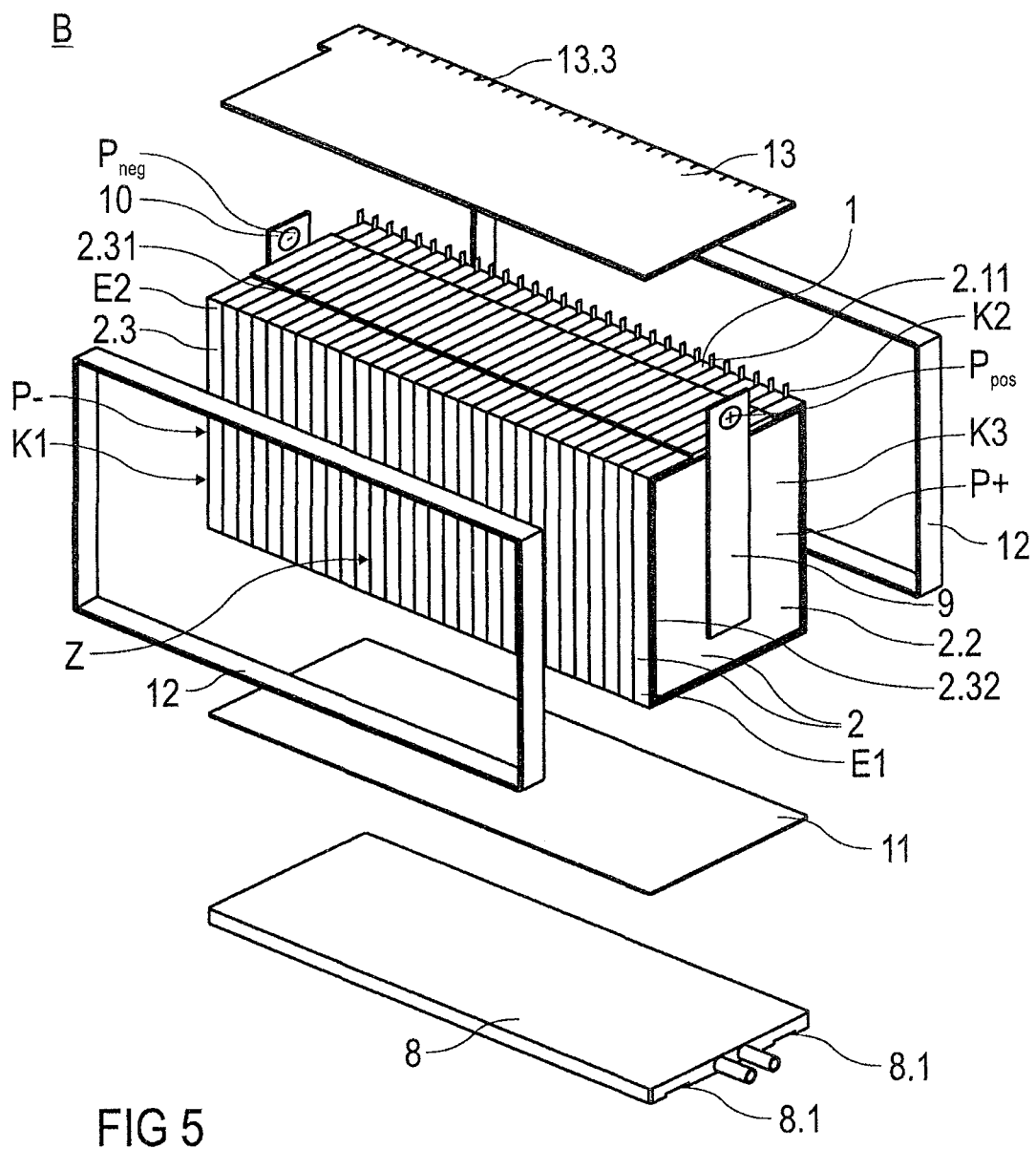
FIG. 5 is an exploded schematic depiction of a battery.
Figure 6:
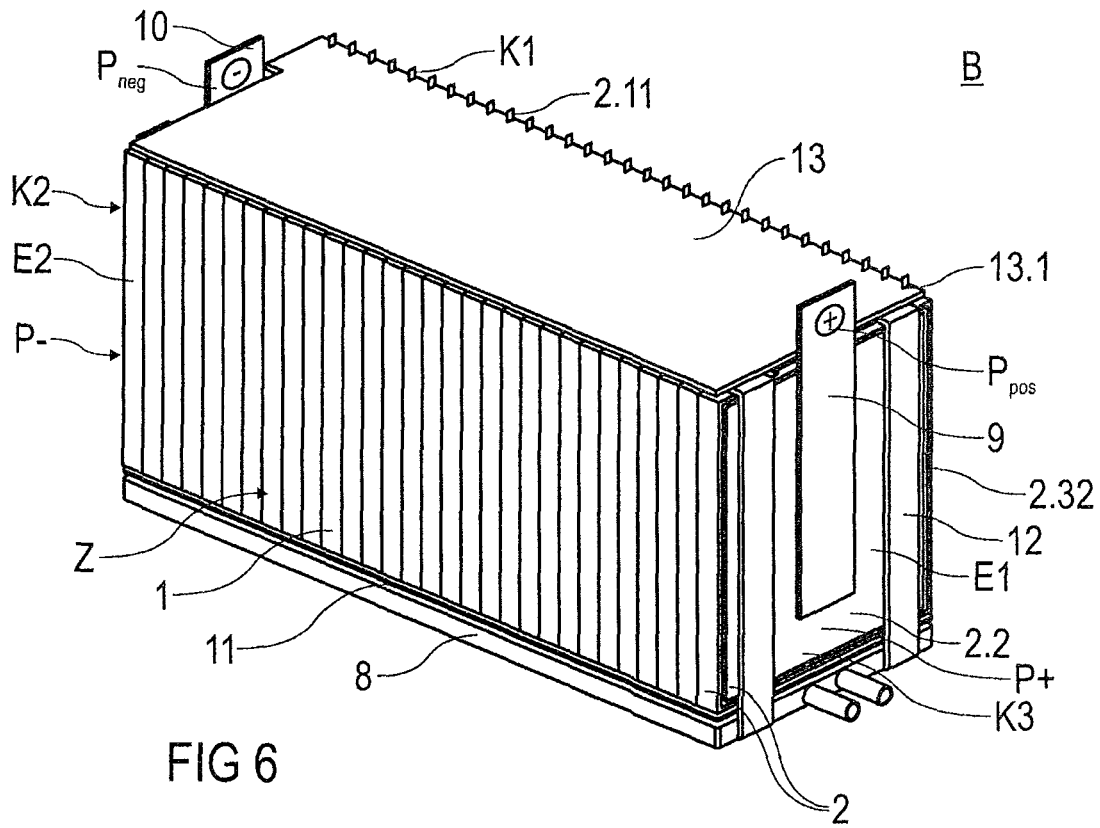
FIG. 6 is a schematic perspective view of the battery according to FIG. 5.
Figure 7:
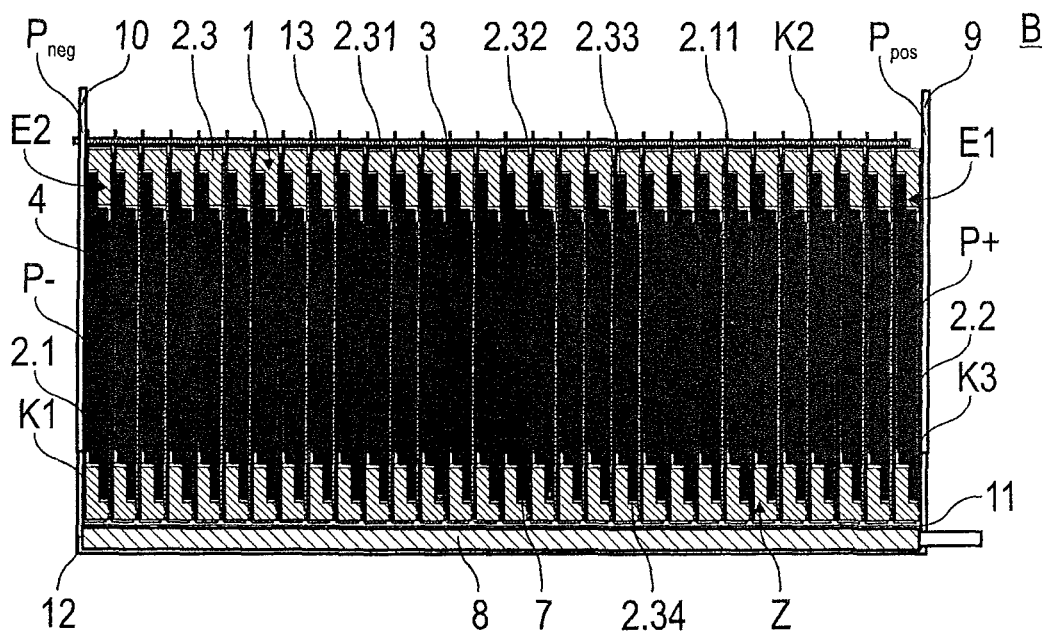
FIG. 7 is a schematic sectional depiction of the battery according to FIG. 6.

The cell housing frame 2.3 additionally has a partial material elevation 2.31 at an upper side, whose function is explained in more detail in the description of FIGS. 5 to 7.

The individual cell 1 thereby has at least three voltage connection contacts K1 to K3. According to the invention, the cell housing side wall 2.1 forming the pole P− has at least two voltage connection contacts K1, K2, which are interconnected electrically in particular within the cell, in particular in parallel. The first voltage connection contact K1 is thereby formed by the pole P− of the individual cell 1 and thus the cell housing side wall 2.1. The second voltage connection contact K2 is designed as a measuring connection 2.11, which projects radially over the cell housing side wall 2.1 at an arbitrary position, over which the individual cell 1 projects as a tab-like extension.

According to the invention, a battery B shown in more detail in FIGS. 5 to 7 consists of a plurality of such individual cells 1, whose poles P+, P−, in particular the cell housing side walls 2.1, 2.2 designed as flat sides, are interconnected with each other in parallel or in series, depending on a desired battery voltage and performance, and form a cell assembly shown in FIGS. 5 to 7.

FIG. 2 shows an advantageous arrangement of the invention in a sectional depiction of the individual cell 1 according to FIG. 1, wherein an electrode stack 4 is arranged in the cell housing 2.

In a center region, electrode films 5 with different polarity, in particular aluminum and/or copper films and/or films of a metal alloy, are stacked above each other and are electrically insulated by means of a separator, in particular a separator film.

In an edge region of the electrode films 5 projecting over the center region of the electrode stack 4, electrode films 5 with the same polarity are connected to each other in an electrical manner. The ends of the electrode films 5 with the same polarity connected to each other thus form a pole contact 7, which is also called current drain tab. The pole contacts 7 with different polarity of the individual cell 1 are further called current drain tabs 7 for a better overview. In detail, the ends of the electrode films 5 are pressed together and/or welded in an electrically conductive manner and form the current drain tabs 7 of the electrode stack 4.

The electrode stack 4 is arranged in the cell housing frame 2.3 passing around the electrode stack 4 on the edge side. The cell housing frame 2.3 has two spaced material depressions 2.33, 2.34 for this, which are formed in such a manner that the current drain tabs 7 with different polarity are arranged in the material depressions 2.33, 2.34. The clear height h of the material depressions 2.33, 2.34 is formed in such a manner that it corresponds to or is smaller than the extension of the current drain tabs 7 which are stacked above each other in an uninfluenced manner. The depth t of the material depressions 2.33, 2.34 corresponds to the extension of the current drain tabs 7 or is formed larger than this.

As the cell housing frame 2.3 is preferably manufactured of an electrically insulating material, the current drain tabs 7 with different polarity are electrically insulated from each other, so that additional arrangements for an electrical insulation are not necessary in an advantageous manner.

With a fastening of the cell housing side walls 2.1, 2.2, which takes place for example in a manner not shown in detail by means of adhesion and/or flanging the flat sides 8 in a recess passing around in the cell housing frame 6, the current drain tabs 7 with different polarity are pressed against the cell housing side walls 2.1, 2.2, so that a respective electrical potential of the current drain tabs 7 is applied at the cell housing side walls 2.1 and 2.2, and these form the poles P+, P− of the individual cell 1.

In a further development of the invention, a film, not shown in detail, which is e.g. made of nickel, can additionally be arranged between the current drain tabs 7, which are e.g. made of copper and the housing side walls 7 and 2.1, 2.2, which are e.g., made of aluminum, in order to achieve an improved electrical connection between the current drain tabs 7 and the cell housing side walls 2.1, 2.2.

In one arrangement of the invention, it is furthermore possible to arrange an electrically insulating film, not shown in detail, between the current drain tabs 7 and the cell housing side walls 2.1, 2.2 or to design the cell housing side walls 2.1 and 2.2 on one side with an electrically insulating layer, so that an electrical contacting of the current drain tabs 7 with the cell housing side walls 2.1 and 2.2 only results with a full penetration welding such as is, known from the state of the art, from the outside through the cell housing side walls 2.1 and 2.2.

Figure 3:
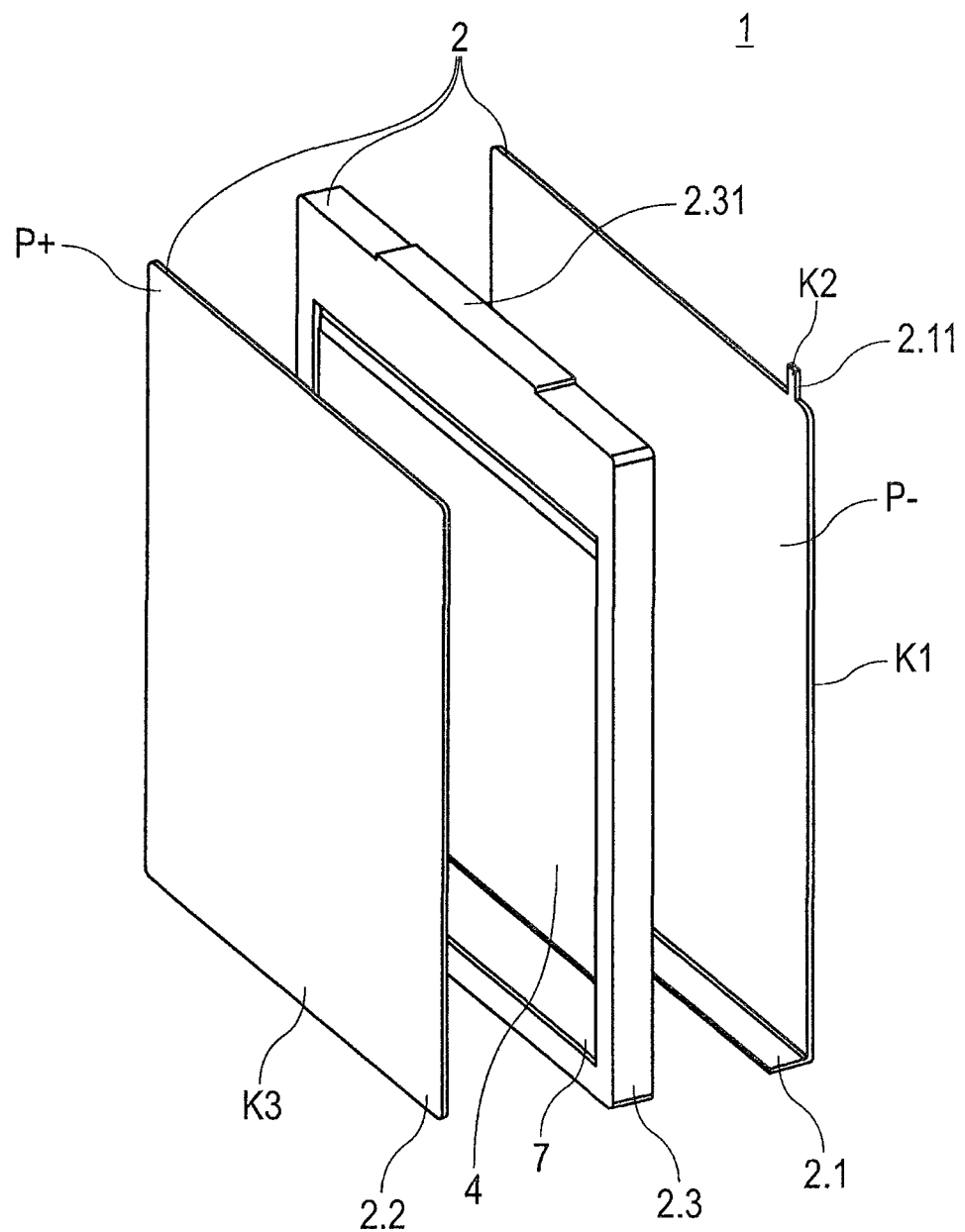
FIG. 3 is an exploded schematic depiction of an individual cell.

FIG. 3 shows an exploded depiction of the individual cell 1 explained in more detail in FIGS. 1 to 2, and shows in particular the arrangement of the electrode stack 4 in the cell housing frame 2.3 and of the cell housing side walls 2.1, 2.2.

In an advantageous arrangement of the invention, the cell housing side wall 2.1 is bent with the tab-like measuring connection 2.11 in a lower region around 90° in the direction of the cell housing frame 2.3, so that, when a heat-conducting plate 8 shown in FIGS. 5 to 7 is used, an enlargement of an effective heat transfer surface and thus an improved cooling of the battery B are achieved.

Figure 4:
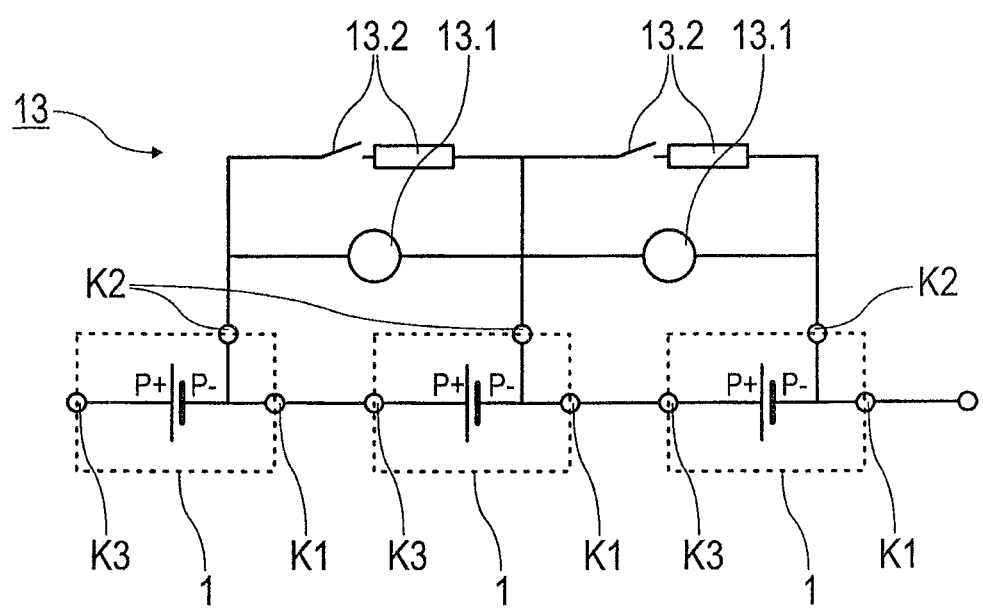
FIG. 4 is a simplified circuit diagram of the electrical interconnection of several individual cells of a battery.

FIG. 4 is a circuit diagram of the electrical interconnection within the cells of the voltage connection contacts K1 and K2 of the one pole P− and thus of the cell housing side wall 2.1. Several individual cells 1 are thereby interconnected in series with each other and form a battery B. The poles P− of the individual cells 1 thereby respectively have two voltage connection contacts K1 and K2, wherein the voltage connection contact K1 forms the P− pole and the voltage connection contact K2 the measuring connection 2.11, to which at least an electronic component 13 can be connected. The electronic component 13 can thereby comprise a device 13.1 for cell voltage monitoring, e.g. a voltage meter, and devices 13.2 for cell voltage balancing, e.g., resistor that can be switched for discharging the individual cells with the highest voltage. The two voltage connection contacts K1, K2 are connected in parallel within the cell.

FIG. 5 is an exploded depiction of a battery B with a cell assembly Z formed of a plurality of individual cells 1. For forming the cell assembly Z, the poles P+, P− of several individual cells 1 are electrically connected in series and/or in parallel in dependence on a desired electrical voltage and performance of the battery B. Also in dependence on the desired electrical voltage and performance of the battery B, the cell assembly Z can be formed of an arbitrary number of individual cells 1 in further developments of the invention.

The electrical interconnection in series of the poles P+, P− of the individual cells 1 shown in FIGS. 4 and 5 is realized by the electrical contacting of the cell housing side walls 2.1, 2.2 of adjacent individual cells 1 with different electrical potential. The cell housing side wall 2.2 of one of the individual cells 1 is thereby in particular connected to the cell housing side wall 2.1 with the tab-like measuring connection 2.11 of an adjacent individual cell 1 in a force-fit, form-fit and/or material-fit manner.

FIGS. 5 to 7 show in an exploded depiction, a perspective view of a sectional diagram, respectively, of the battery B, which is for example used in a vehicle, in particular a hybrid and/or electric vehicle.

The battery B is formed of thirty individual cells 1 in the shown embodiment, which are electrically interconnected with each other in series. For taking out and/or supplying electrical energy from or into the battery B, an electrical connection element 9 is arranged at the cell housing side wall 2.2 of the first individual cell E1 of the cell assembly Z, which in particular forms the positive pole P+ of the first individual cell E1. This connection element 9 is designed as an electrical connection tab and forms the positive pole connection $P_{pos}$ of the battery B.

An electrical connection element 10 is also arranged at the cell housing side wall 2.1 of the last individual cell E2 of the cell assembly Z, which in particular forms the negative pole P− of the last individual cell E2. This connection element 10 is also designed as an electrical connection tab and forms the negative pole $P_{neg}$ of the battery B.

In the shown sensible continuation of the invention, the cell assembly Z is thermally coupled to the heat-conducting plate 8. The cell housing side walls 2.1 are thereby thermally coupled to the heat-conducting plate 8 with the lower region bent by 90° in the direction of the cell housing frame 2.3 directly or indirectly via a heat-conductive material, in particular a heat-conducting film 11, so that an effective cooling of the battery B is achieved.

In a further development of the invention, the heat-conductive material can additionally or alternatively be formed of a casting mass and/or a lacquer.

For a force-fit connection of the individual cells 1 with the cell assembly Z and a force-fit connection of the heat-conducting plate 8 and the heat-conducting film 11 to the cell assembly Z, the cell assembly Z, the heat-conducting plate 8 and the heat-conducting film 11 are arranged in a housing frame.

This housing frame is preferably formed of one or several clamping elements 12 completely surrounding the cell assembly Z, e.g. clamping straps, which connect the individual cells 1 or the cell assembly Z, the heat-conducting plate 8 and the heat-conducting film 11 in the horizontal and in the vertical direction in a force-fit manner.

In order to enable a safe hold of the clamping elements 12, material recesses 8.1 preferably corresponding to the dimensions of the clamping elements 12 are formed at a bottom side of the heat-conducting plate 8.

In further developments of the invention (not shown in detail), some or all components (that is, the individual cells 1, the heat-conducting plate 8, the heat-conducting film 11 or the entire battery B) can alternatively or additionally be built into a battery housing in a partially or completely encapsulated manner.

If the battery B is for example a lithium ion high voltage battery, a special electronics is generally needed, which e.g. monitors and corrects a cell voltage of the individual cells 1, a battery management system, which controls in particular a performance intake and discharge of the battery B (=battery control) and safety elements, which carry out a safe separation of the battery B from an electrical grid with malfunctions of the of the battery B.

In the shown embodiment of the invention, an electronic component 13 is provided, which contains at least devices for the cell voltage monitoring and/or for a cell voltage balance, not shown in detail. The electronic component 13 can also be formed as an encapsulated electronic component in a continuation of the invention.

The electronic component 13 is arranged at the cell assembly on the top side on the clamping elements 12 and the cell housing frame 2.3 of the individual cells 1. In order to achieve a support surface of the electronic component 13 that is as large as possible, and simultaneously to fix the clamping elements 12 at the upper side of the cell assembly Z, the material elevation 2.31 is formed partially at the upper side of the frame 2.3 of each individual cell 1, wherein the height of the elevation in particular corresponds to the thickness of the clamping element 12. For a fastening of the electronic component 13 to the cell assembly Z and/or to the clamping elements 12, force-fit, form-fit and/or material-fit connection techniques (not shown in detail) are used.

For an electrical contact of the cell assembly Z with the electronic component 13, the tab-like measuring connections 2.11 arranged at the cell housing side walls 2.1 are guided through contact elements 13.3 arranged in the electronic component 13, which elements have a corresponding form to the tab-like measuring connections 2.11.

Additionally, further electronic units, not shown, are provided, which contain for example the battery management system, the battery control, the safety elements and/or further devices for operating and controlling the battery B.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

1 Individual cell
2 Cell housing
2.1 Cell housing side wall
2.11 Measuring connection
2.2 Cell housing side wall
2.3 Cell housing frame
2.31 Material elevation
2.33 Material depression
2.34 Material depression
4 Electrode stack
5 Electrode film
6 Separator
7 Pole contact (current drain tab)
8 Heat-conducting plate
8.1 Material recess
9 Electrical connection element
10 Electrical connection element
11 Heat-conducting film
12 Clamping element
13 Electronic component
13.1 Device for the cell voltage monitoring
13.2 Device for the cell voltage balancing
13.3 Contact element
B Battery
E1 First individual cell
E2 Last individual cell
h Height
K1 to K3 Voltage connection contacts
P+ Positive pole
P− negative pole
$P_{neg}$ Negative pole connection
P pos Positive pole connection
Z Cell assembly

The invention claimed is:

1. A battery having a plurality of individual cells with poles that are electrically interconnected with each other, forming a cell assembly; wherein:
    each individual cell is surrounded by a cell housing formed of two cell housing side walls and a cell housing frame that is arranged between the cell housing side walls around on an edge thereof, and electrically insulates the cell housing side walls;
    at least one pole of each individual cell has at least two voltage connection contacts;
    the poles of each of the individual cell are formed by the cell housing side walls;
    pole contacts of each individual cell are placed directly on cell housing walls electrically insulated with regard to each other;
    the poles of different individual cells are connected to each other;
    the cell housing frame has two electrically insulated and spaced material depressions, in which the pole contacts of the respectively one polarities are arranged;
    a clear height of the material depressions, measured in a stacking direction of the electrode films, is smaller than or equal to a corresponding extent of the associated pole contacts stacked above each other in an uninfluenced manner; and
    a depth of the material depressions, measured parallel to a flat side of an electrode film is at least as large as the corresponding extension of the associated pole contacts.

2. The battery according to claim 1, wherein the voltage connection contacts of one of the poles of each cell are electrically interconnected with each other within the cell.

3. The battery to claim 1, wherein:
    a first voltage connection contact forms one of the poles of the individual cell; and
    the second voltage connection contact forms a measuring connection.

4. The battery according to claim 1, wherein the poles of different individual cells are electrically interconnected with each other by contacting of the cell housing side walls of the individual cells.

5. The battery according to claim 1, wherein:
    an electrode stack is arranged in each cell housing;
    individual electrodes, of the electrode stack are connected to the pole contacts formed as current drain tabs in an electrically conductive manner.

6. The battery according to claim 1, wherein at least electrodes of different polarity are insulated from each other by a separator.

7. The battery according to claim 1, wherein pole contacts with the same polarity are connected to each other in an electrically conductive manner.

8. The battery according to claim 1, wherein pole contacts with the same polarity are pressed together and/or welded in an electrically conductive manner.

9. The battery according to claim 1, wherein the cell housing side walls are as flat sides.

10. The battery according to claim 1, wherein an electrical connection element is arranged at a cell housing side wall of a first individual cell and a cell housing side wall of a last individual cell of the cell assembly.

11. The battery according to claim 1, further comprising a heat-conducting plate for cooling the battery.

12. The battery according to claim 11, further comprising a heat-conductive material disposed between the heat-conducting plate and the cell assembly.

13. The battery according to claim 12, wherein the heat-conductive material is one of a casting mass, a lacquer and a heat-conducting film.

14. The battery according to claim 1, wherein the cell assembly and a heat-conducting plate are arranged in a housing frame.

15. The battery according to claim 14, wherein the housing frame is formed of at least one clamping element that surrounds cell assembly completely.

16. The battery according to claim 15, wherein the clamping element is one of a clamping strap and a clamping frame.

* * * * *